United States Patent [19]

Butler et al.

[11] Patent Number: 4,996,653

[45] Date of Patent: Feb. 26, 1991

[54] LINE GENERATION IN A DISPLAY SYSTEM

[75] Inventors: Nicholas D. Butler, Romsey; Adrian C. Gay, Fareham, both of United Kingdom; Jack E. Bresenham, Chapel Hill, N.C.

[73] Assignee: International Business Machines Corporation, Armonk, N.Y.

[21] Appl. No.: 138,241

[22] Filed: Dec. 28, 1987

[30] Foreign Application Priority Data

Jul. 30, 1987 [GB] United Kingdom ................. 8718074

[51] Int. Cl.[5] ............................................. G06F 15/20

[52] U.S. Cl. ..................................... 364/521; 364/518

[58] Field of Search ................................ 364/518–522; 382/44–48

[56] References Cited

U.S. PATENT DOCUMENTS

| | | | |
|---|---|---|---|
| 4,319,331 | 3/1982 | Elbaum et al. | 364/518 |
| 4,330,834 | 5/1982 | Murphy | 364/521 |
| 4,819,190 | 4/1989 | Hinman et al. | 364/521 |
| 4,827,432 | 5/1989 | Kasano | 364/518 |
| 4,831,557 | 5/1989 | Muratal | 364/521 |

FOREIGN PATENT DOCUMENTS 1224224 3/1971 United Kingdom .

OTHER PUBLICATIONS

Wescon 86/Conference Record, vol. 30, 18–20, Nov. 1986, pp. 1–17, Los Angeles, CA., U.S.; C. Hastings et al.: "When is a memory not a memory?".

Foley et al., *Fundamentals of Interactive Computer Graphics*, pp. 431–446, 1982.

*Primary Examiner*—Dale M. Shaw
*Assistant Examiner*—H. R. Herndon
*Attorney, Agent, or Firm*—Mark S. Walker; J. Dennis Moore

[57] ABSTRACT

In a line generator and a method for determining the individual pixels to be plotted for a line to be drawn in a display system, coded representations of a plurality of lines are stored in a line definition table. The coded representation of each individual line is a string of data items representing the transitions between adjacent pixels to be plotted for drawing the individual line. Preferably, only coded representations of lines up to a predetermined size (i.e. the length of the line in the case of a straight line) are stored in the line definition table. Strings of data items for representing the pixels to be plotted for longer lines to be drawn are still calculated as in the prior art. In this case, control logic determines whether there are coded representations of a line to be drawn in the line definition table, or not, and passes control to appropriate processing logic for determining the pixels to be plotted. In a preferred embodiment, the string of data items forming the coded representation of a line to be drawn is a string of binary digits and the value of each bit in the string represents a transition in one of two directions. This provides a very compact representation of the line.

17 Claims, 3 Drawing Sheets

LINE GENERATION IN A DISPLAY SYSTEM

BACKGROUND OF THE INVENTION

1. Field of the Invention

The present invention relates to a line generator and a method for determining the individual pixels to be plotted for a line to be drawn in a display system, and to a display system incorporating such a line generator.

2. Background Art

To automatically draw a line on a pixel-based display screen, plotter and so on is not a trivial task. A lot of effort has been put into the solving the problem of providing a representation, within a reasonable response time, of a line on a screen, a plotter, and so on which appears accurate to the user. This task is non-trivial because a line to be drawn will, in the general case, only pass through pixel positions on the screen, plotter field and so on, which are too far apart to create a continuous line. As a result of this the system has to determine intermediate pixels positions to be used in order to approximate the line to be drawn.

Many different techniques for deciding which pixel positions are needed have been proposed, and a number of them are described in Foley and Van Dam's book "Fundamentals of Interactive Graphics" published in 1982 by Addison-Wesley Publishing Company. On pages 432 to 438 techniques for drawing straight lines are described and on pages 441 to 446 techniques for drawing other lines such as circular arcs are described. The major disadvantage of all of these prior techniques is that there is a significant amount of processing to be done each time a line is selected before that line can actually be drawn. The time take to carry out this processing (i.e. set-up and algorithm execution time) provides a significant overhead which limits the performance of the display system.

In GB -A- 2048624 (U.S. Pat. No. 4,330,834) an attempt to overcome disadvantages of the prior art is described. In cell-organized graphic display apparatus representations of segments of lines within a character cell are pre-stored and then used to plot lines on the display. In order to avoid the need to store all possible lines which could cross a cell (wholly or partially) a subset only of the possible lines are pre-stored and masking and shifting logic is provided. This further logic also provides a processing overhead which reduces the advantages of this prior approach. Also, as most of a cell is traversed by a line will be background only, inefficient use of storage is made.

The object of the present invention is to provide an efficient line generator which overcomes the difficulties of the prior art.

SUMMARY OF THE INVENTION

In accordance with a first aspect of the present invention there is provided a line generator for determining the individual pixels to be plotted for a line to be drawn in a display system, said line generator comprising a line definition means including a line definition table in each of a plurality of discrete entries of which a coded representation of a respective one of a set of lines is stored, the coded representation of each individual line comprising a string of data items representing the transitions between adjacent pixels to be plotted for drawing said individual line, and address logic for accessing an appropriate entry in the line definition table for the coded representation of a line to be drawn.

In accordance with a second aspect of the present invention there is provided a method of determining the individual pixels to be plotted for a line to be drawn in a display system, the method including the step of accessing a coded representation of the line from a line definition table in each of a plurality of discrete entries of which a coded representation of a respective one of a set of lines is stored, the coded representation of each individual line comprising a string of data items representing the transitions between adjacent pixels to be plotted for drawing said individual line.

The present invention enables setup and algorithm execution time to be saved while making efficient use of storage by pre-storing coded representations of lines in terms of strings of data items representing the transitions between adjacent pixels to be plotted and then using the coded representations when drawing the lines.

Preferably, the set of lines comprises only lines up to a predetermined size (i.e. the length of the line in the case of a straight line), and in the line generator additionally comprises further line definition means for automatically computing a string of data items representing a line to be drawn which is greater than said predetermined size. In this way the performance advantages of using stored representations can be exploited for short lines where the setup time is a significant factor without a significant storage overhead for the coded representations.

In a particular embodiment of the present invention to be described hereafter, which is based on a prior line drawing technique for drawing straight lines commonly known as "Bresenham's Line Algorithm", the transitions between adjacent pixels positions for representing a straight line are in only one of two directions: an axial direction and a diagonal direction. For this and other similar algorithms, the string of data items forming the coded representation of a line to be drawn can be a string of binary digits where the value each bit in the string represents a transition in one of the two directions. In this way a very compact representation of the line is possible.

In the particular embodiment to be described, the string of bits for representing a line can be arranged to be the same as the string of error terms which would be output by a conventional line generator which evaluates Bresenham's line algorithm with the advantage that the coded representation can be used to drive plotting logic which is designed to operate with conventional Bresenham line generation logic.

BRIEF DESCRIPTION OF THE DRAWINGS

In order that the present invention may be more fully appreciated, there follows a description of a particular embodiment of the present invention with reference to the accompanying drawings in which.

DETAILED DESCRIPTION OF THE PREFERRED EMBODIMENT

In the following, a particular embodiment of the present invention is described which is based on a prior technique for generating a straight line which is known as Bresenham's Line Algorithm. This technique is described on pages 433 to 436 of Foley and Van Dam's book, referred to above, and in an article by J. E. Bresenham entitled "Algorithm for Computer Control of Digital Plotter", which was published on pages 25 to 30 of the IBM Systems Journal, Vol. 4, No. 1 in 1986. It will be appreciated from the following that other specific embodiments of the present invention may be based on other line drawing techniques, whether for drawing straight lines or other lines such as curves.

Figure 1:
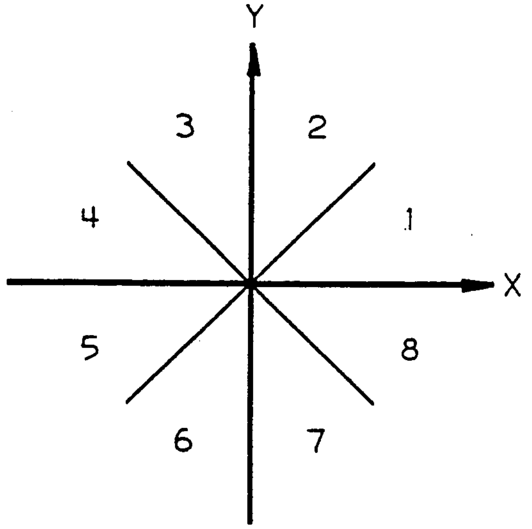
FIG. 1 is an illustration of a coordinate system indicating the subdivision of a two dimensional space into octants.

Bresenham's Line Algorithm is defined for lines starting at the origin and extending away therefrom within the first octant 1 of the coordinate system as illustrated in FIG. 1. Lines in the remaining octants 2 to 8 can be computed using Bresenham's Line Algorithm by normalization such that the equivalent line within the first quadrant is computed and the results of the algorithm are transposed using the symmetry of the coordinate space to the actual position in space of the line to be drawn. Bresenham's algorithm assumes that the starting and finishing points of the lines are given in terms of pixel positions. The algorithm then enables the individual pixel positions which are to be used to represent the line to be computed.

Figure 2:
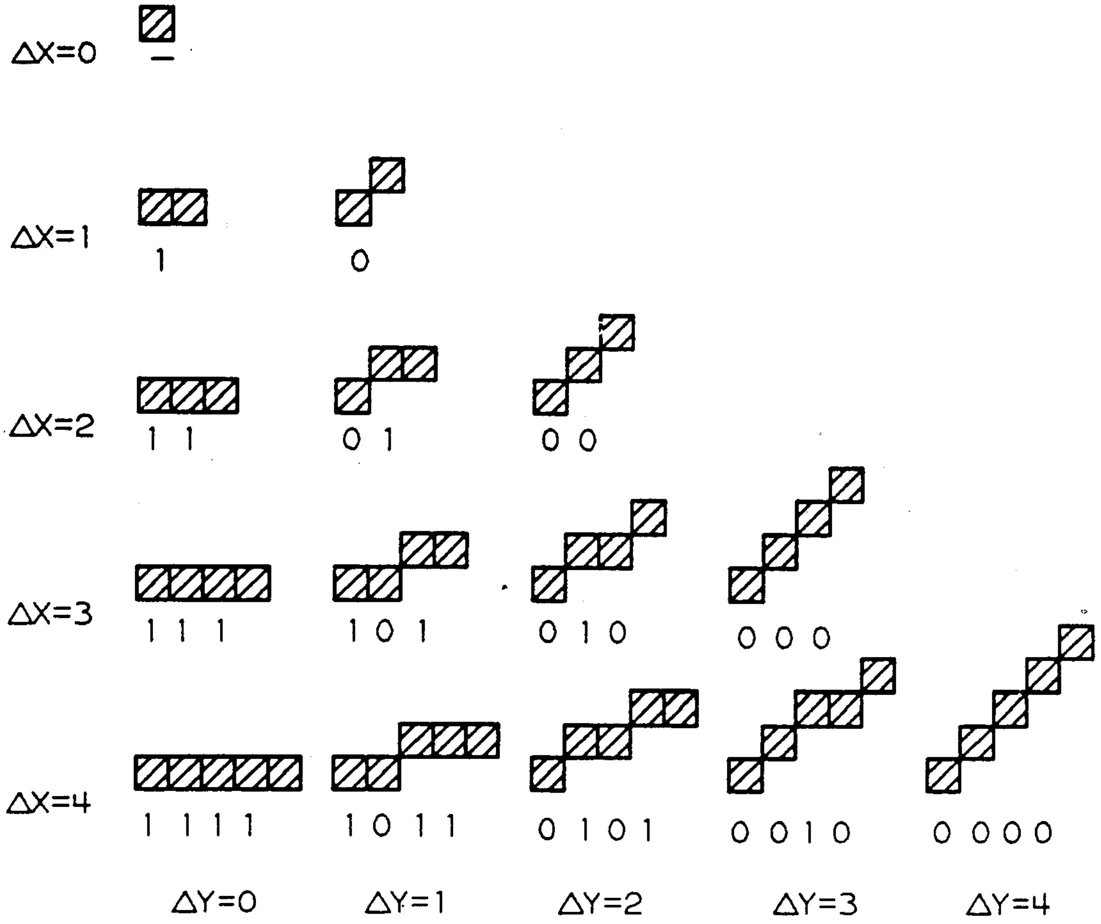
FIG. 2 is an illustration of a number of short vectors produced in accordance with Bresenham's Line Algorithm and of coded representations of those vectors.

FIG. 2 illustrates all the first octant normalized lines with up to and including five pixels produced using Bresenham's Line Algorithm. The algorithm will not be described in detail as it is well known in the art and is well documented elsewhere (see the references above). It is, however, relevant to note that the algorithm steps along a line to be drawn and calculates, at each increment in the horizontal axial direction, a decision (or error) variable which is dependent on the distances between the true line position and the pixel position above and below that position and chooses the pixel nearest to the true line position for representing the line at that step along the horizontal axis. The algorithm uses integer arithmetic and produces, as its output, either a positive or negative value.

For a given change in the coordinate value from one end of the line to the other for each of the X and Y axes, Bresenham's Line Algorithm selects a unique set of pixels to be displayed. As the algorithm works for lines which are normalized into the first octant (see FIG. 1), the different number of lines for each minor axis length ($\Delta Y$) must be less than or equal to the equivalent major axis length ($\Delta X$). The major axis length ($\Delta X$) is defined as the difference between the major axis coordinates (in pixel positions) of the two end points of the line. Similarly, the minor axis length ($\Delta Y$) is defined as the difference between the minor axis coordinates (in pixel positions) of the two end points of the line.

If a set of lines is defined as all the lines having up to N pixels which are generated in accordance with Bresenham's Line Algorithm, the set will comprise the following number of lines:

$$N+(N-1)+(N-2)+\ldots+2+1.$$

Table 1 shows the number of lines which can be generated for the following numbers (N) of pixels:

TABLE I

| No. of Pixels | No. of Lines |
|---|---|
| 5 | 15 |
| 8 | 36 |
| 12 | 78 |
| 15 | 120 |
| 16 | 136 |
| 32 | 528 |

In accordance with Bresenham's technique which was referred to above and indeed for all known prior techniques, the actual pixels for any desired line are calculated when the line is to be displayed. In accordance with the present invention on the other hand, lines can be generated using a stored coded representation of the line which was computed in advance.

The present invention makes use of the fact that the transitions between any two adjacent pixels which are used to display any line on the screen can occur in a limited number of directions. In the case of Bresenham's Line Algorithm, for example, lines are generated pixel-by-pixel in one of two directions, axially (i.e. by stepping along the major axis) or diagonally (i.e. by stepping one step in both the major and minor axial directions), as controlled by the sign of the decision variable mentioned earlier. If the decision variable at any stage is greater than or equal to zero, this means that there will be a diagonal transition from the current pixel to the next one to be plotted. If on the other hand the decision variable turns out to be negative, this means that the transition will be horizontal.

FIG. 2 also shows coded representations for the lines in the form of strings of binary digits. The coded representations are shown directly under the lines they represent. It should be noted that the coded representation for any given line has a number ($\Delta X$) of bits one less than the number of pixels in the line it represents. Thus, the representation for the line $\Delta X=0$, $\Delta Y=0$ (could be void or treated as a single point). As shown, a binary 1 represents a transition in a horizontal axial direction (from left to right) and binary 0 represents a transition in the diagonal direction (from lower left to upper right).

Using this encoding it is possible to represent a line in a very compact manner. For a given maximum size of line (e.g. lines with seventeen pixels) all the possible lines can be computed once and for all and bit strings stored in a line definition table having a word length which can accommodate the required number of bits (e.g. 16-bit words in the case of a maximum line size of 17 pixels). Subsequently, when a line of up to 17 pixels needs to be drawn, the stored representation can be used to generate the line on the display instead of carrying out the computation of the pixels to be displayed from scratch.

For lines generated in accordance with Bresenham's Line Algorithm, the binary bit strings to be stored in the table can be determined by initially evaluating Bresenham's Line Algorithm for the lines of interest. For each line a string of binary digits is established with a binary 1 value being stored for each horizontal increment at which the decision variable has a negative value and a binary 0 being stored where the decision variable has a positive value. The coded representations are then stored in a line definition table in a manner in which they can be retrieved.

Figure 3:
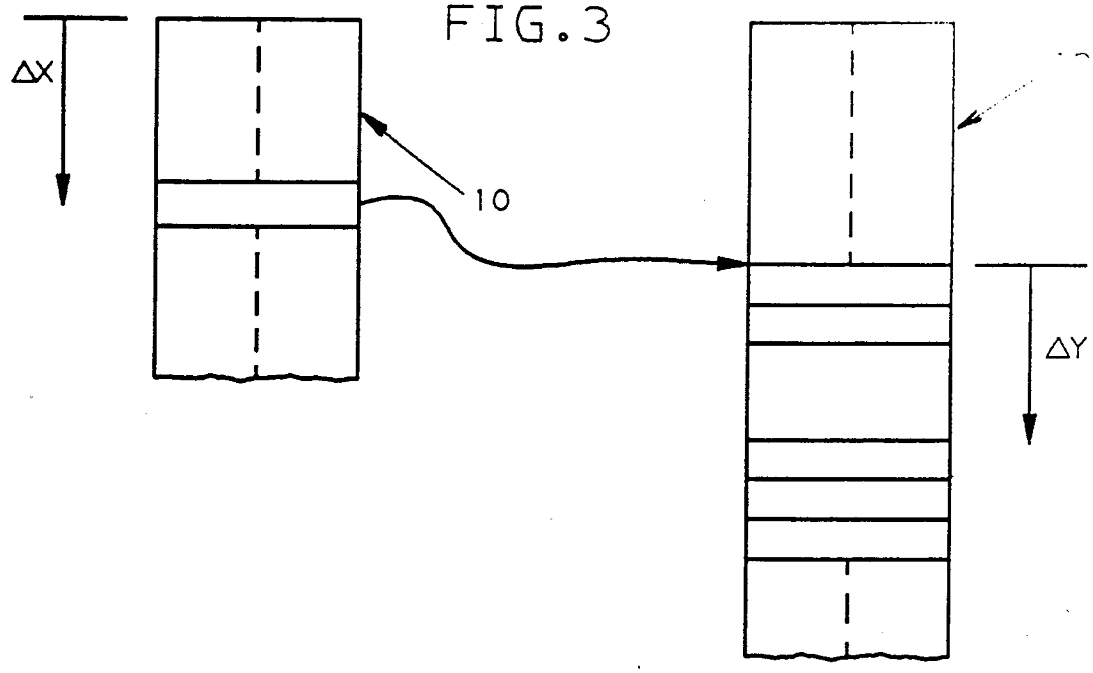
FIG. 3 is a schematic block diagram of a storage methodology for a plurality of coded representations such as those shown in, FIG. 2.

FIG. 3 illustrates a preferred two-level indexing arrangement of the line definition table. This arrangement is preferred because it is efficient in its use of storage as the table has a variable number of entries for each line length. For a given line to be drawn, the ΔX and ΔY values are computed and then these values are used to access the coded representation for that line. The ΔX value is used to access a linear table 10 of offsets which point to the variable length groups of line definitions in the line definition table 12. The ΔY value is then used to index the appropriate definition (i.e. the coded representation) from the selected group.

It will be appreciated that other storage methodologies can be used. The best performance from a speed point of view would be given by an N * N table, where N is the maximum line length using one level of index, but only half of the table would be occupied in this case.

Further table compaction can be achieved if horizontal and/or diagonal lines are not stored in the table. It will be noted in FIG. 2 that a horizontal line is represented by a string of binary 1 values and a diagonal line is represented by a string of binary 0 values. In view of this the generation of these lines can be performed simply with special logic. If, in computing the contents of the table, this is taken into account, the number of bit strings that need to be stored can be reduced by 2N−1, where N is the maximum number of pixels in a line. The number of table entries for a given maximum number of pixels in a line thus reduces to the following numbers for the line sizes set out in table 1 above.

TABLE II

| No. of Pixels | No. of Lines |
|---|---|
| 5 | 6 |
| 8 | 21 |
| 12 | 53 |
| 15 | 91 |
| 16 | 105 |
| 32 | 465 |

Figure 4:
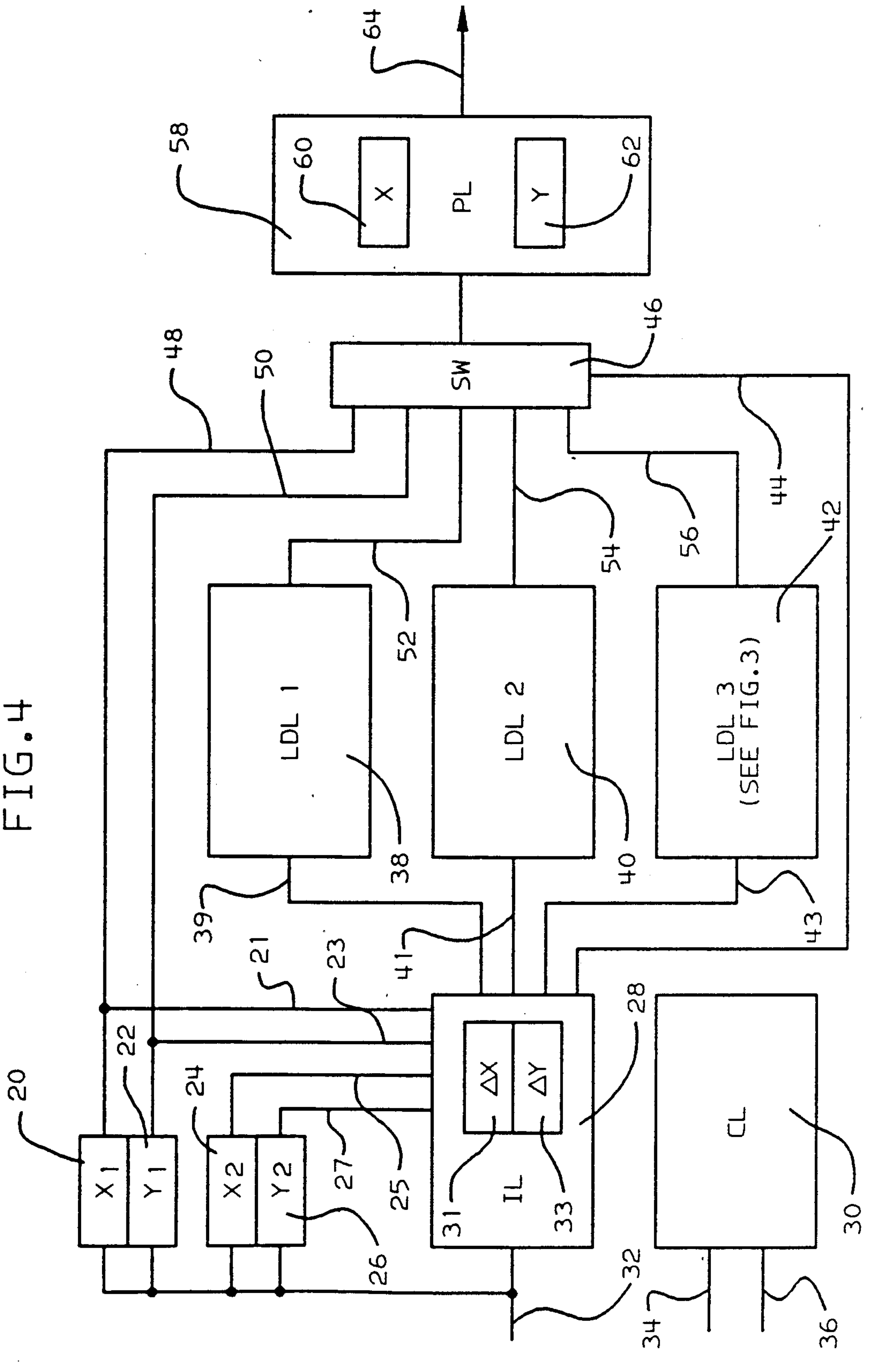
FIG. 4 is a schematic diagram illustrating logical elements of a particular embodiment of the present invention.

FIG. 4 presents a schematic overview of logical elements in a particular embodiment of a line generator incorporating the present invention. Only those elements which are relevant to the line generator itself are shown in the Figure. It will be understood that the line generator will normally be incorporated in a workstation or other display system, which can otherwise be of conventional form (See FIG. 5).

The line generator shown comprises initial X and Y and final X and Y registers 20, 22, 24, 26 for receiving initial ($X_1$,$Y_1$) and final ($X_2$, $Y_2$) line coordinate positions of a line to be drawn via connection 32 from a source external to the line generator. These data may be generated in any conventional manner in response to manual input using a mouse or other suitable input means or as a product of a task being performed by workstation or other computing apparatus in which the line generator is incorporated and are input to the line generator in terms of pixel display positions.

The line generator also comprises control logic 30 for setting up and controlling the operation of the line generator as will be explained later. No links between the control logic and the other elements of the line generator are shown in FIG. 4, for reasons of clarity.

Initialization logic 28 is arranged to receive the initial and final line coordinate information via lines 21, 23, 25, and 27 from the initial X and Y and final X and Y registers 20, 22, 24, 26. The initialization logic computes ΔX and ΔY values for the line to be drawn by determining the difference, in the number of pixels, between the initial and final line coordinates and stores the results in ΔX and ΔY registers 31 and 33. The initialization logic also set, via link 44, the switch, or multiplexer means 46 to enable the X and Y coordinate values $X_1$ and $Y_1$ of the initial point on the line to be passed to plotting logic 58 for setting X and Y counters 60 and 62. The X and Y counters are used to indicate the coordinate position of a pixel to be plotted.

The initialization logic 28 also determines, from the ΔX and ΔY values, whether the line is a horizontal or diagonal line and whether the line has more than 17 pixels, or not. Depending on the result of this determination, the initialization logic then sets the switch 46 to receive information from one of a number of line definition logic units and passes control to the selected unit for the detailed processing of the line definition to be drawn. In this specific line generator, there are first line definition logic (special case line generation logic) 38, second line definition logic (Bresenham line generation logic) 40 and third line definition logic (table look-up logic) 42. The first line definition logic 38 comprises special purpose logic for defining the transitions between pixels for horizontal and diagonal lines. The second line definition logic 40 comprises line generation logic for implementing Bresenham's Line Algorithm and the third line definition logic 42 comprises a line definition table as shown in FIG. 3 for storing coded representations of all lines with up to 17 pixels (i.e. ΔX>17) generated in accordance with Bresenham's Line Algorithm except the horizontal and diagonal lines and associated logic for accessing the coded representations.

If, therefore, the line is determined to be a horizontal line (i.e. ΔY=0), or a diagonal line (i.e. ΔX=ΔY) then control is passed to the first line generation logic 38 for performing the line processing and switch 46 is set to receive the data output therefrom via line 52.

Otherwise, if the size, or length of the line is such that coded line representations for that length of line are not stored in the line definition table 12 (i.e. for ΔX>16) then control is passed to the second line generation logic 40 for performing the line processing and the switch 46 is set to receive the data output therefrom via link 54.

If the line does not meet either of the above tests, then it means that a coded representation for that line is held in the line definition table and consequently control is passed to the third line generation logic 32 for performing the line processing and the switch 46 is set to receive the data output therefrom via link 56.

The first, second or third line generation logic, whichever one receives control from the initialization logic, operates to produce a string of binary signals which are passed to the plotting logic via the switch 46 to control the Y counter in the plotting logic 58. Each binary signal indicates whether the Y counter is to be incremented or not at each step along the line. At each step along the line, irrespective of the binary value of controlling the Y counter, the X counter is incremented.

The first line generation logic 38 is simple logic which outputs a binary 0 signal at each increment along the X axis if the line to be drawn is a diagonal, this causing the Y counter to be incremented at the same rate as the X counter, or outputs a binary 1 signal at each increment along the X axis if the line to be drawn is horizontal, this causing the Y counter to be held at its initial value as the X counter is incremented.

The second line generation logic 40 is Bresenham line drawing logic and comprises setup logic for computing initial values for input to execution logic for executing Bresenham's Line Algorithm using those values. The Bresenham line drawing logic is conventional with the exception that it is arranged to produce a string of binary values at its output. It steps along the line to be drawn computing a pixel position for representing the line at each step. A binary value is output from the second line generation logic at each step in dependence on the sign of the decision variable computed at that step. Thus, of the output of the decision variable is not negative at any step, a binary signal 0 is output, this causing the Y counter to be incremented with the X counter, whereas, if the decision variable is negative, a binary 1 signal is output, this causing the Y counter to be held at its former value while the X counter is incremented.

The third line generation logic comprises a storage arrangement as shown in FIG. 3 including a line definition table. In addition, the third line generation logic includes addressing logic for accessing the line definitions stored therein using the ΔX and ΔY values for the line as address parameters, and a temporary buffer for receiving the contents of the addressed location. Coded representations of axial and diagonal lines (including the trivial case of a single pixel) are not stored in the line definition table as these lines are treated by the special case line generation logic. The addressing logic has therefore to take account of this when determining the offsets for addressing the linear list of offsets 10 and the line definition table 12 from the ΔX and ΔY values. The contents of the addressed location form the coded line representation in the form of a string of bits. The string of bits is left justified in the memory words in the line definition table in the present embodiment, with the memory words packed out with binary zeros. It will be apparent however that other arrangements are possible. When a line definition table location is addressed, the string of binary bits is first read into the temporary buffer and then read out therefrom bit by bit. The addressing logic is accordingly arranged to control the number of bits output using the ΔX value for the line in question. If a binary 0 signal is output at a particular increment along the X axis the Y counter is caused to be incremented with the X counter. If a binary 1 is output at an increment along the X axis, the Y counter is caused to be held at its former value as the X counter is incremented.

Although the output of the three line definition logic units has the same form, the second line generation logic takes significantly longer to produce the output than does the first and third line definition logic because of the setup and execution time for processing the line definition algorithm.

The updating of the X and Y counters is controlled, in response to the output of the appropriate line definition logic by the plotting logic 58. The current values of the X and Y registers are output at 64 from the plotting logic for identifying the current pixel position to be plotted as explained below.

Figure 5:
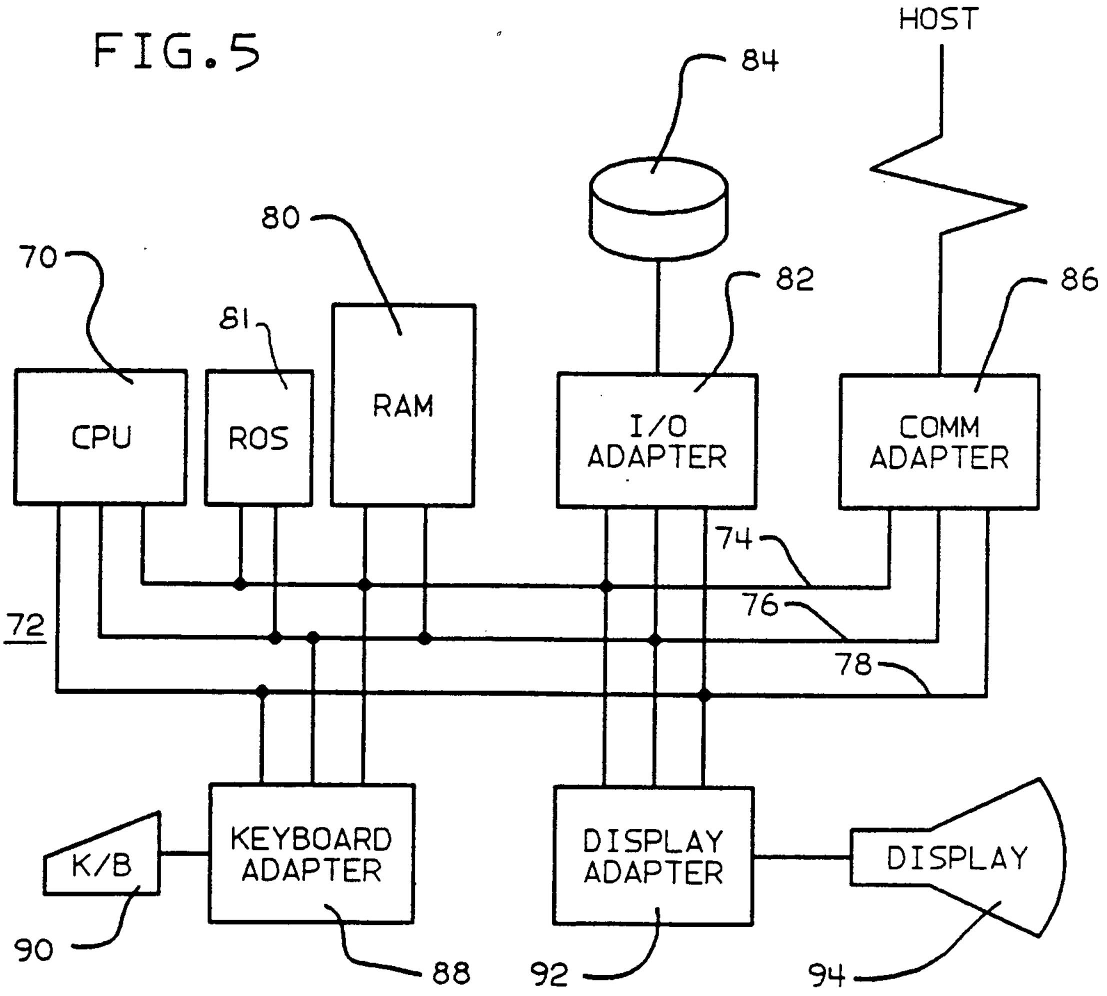
FIG. 5 is a schematic block diagram of a workstation in which the present invention may be implemented.

The detailed implementation of a line generator in accordance with the present invention may take many forms. FIG. 5 shows an overview of a workstation in which the present invention is implemented. The workstation comprises a central processing unit 70 in the form of a conventional microprocessor and a number of other units connected thereto in a conventional manner by a system bus. The system bus comprises a data bus 74, and address bus 76 and a control bus 78. Connected to the system bus is a random access memory (RAM) 80 and read only storage (ROS) 81. An I/0 adapter 82 is provided for connecting the system bus to peripheral devices 84 such as disk units. Similarly, a communications adapter 86 is provided for connecting the workstation to external processors (e.g. a host computer). A keyboard 90 is connected to the system bus via a keyboard adapter 88 and, in the same way, a display device 94 is connected to the system bus via a display adapter 92. As the computing hardware is, in present implementation of the invention, conventional, no further details thereof need be given.

In the present implementation, the line generator is implemented by means of suitable code in the ROS 81 and/or the RAM 80 for controlling the processor and configuring the RAM. In this implementation therefore, the line definition table of FIG. 3 and the storage elements shown in FIG. 4 and referred to in the text are formed by suitably configuring the RAM 80. The various logic units shown in FIG. 4 are similarly provided by means of suitable code in the ROS and/or RAM. The lines showing the connections or links between the various logic units would then be provided by jumps and/or conditional jumps in the code. The contents of the X and Y registers 60 and 62 in the plotting logic 58 are output at 64 (see FIG. 4) for addressing the workstation's display buffer in order to identifying the pixel locations at which the pixel information for the line is to be drawn. In the particular implementation of the invention shown in FIG. 5, the display buffer is formed from a specially configured portion (not separately identified) of RAM 80.

Although a particular embodiment and a particular implementation of the present invention are described in the above, it will be appreciated by those skilled in the art that many modifications and additions are possible within the scope of the attached claims.

Although, in the workstation of FIG. 5, the present invention is implemented using conventional hardware, it will be understood by those skilled in the art that the invention could equally be implemented using microprogrammed logic and/ or special hardware, with or without the providing of additional storage elements and/or registers for the storage of data. The line definition table and the third line generation logic of FIGS. 3 and 4 could, for example, comprise a separate memory unit and hardwired logic respectively.

Indeed, the whole of the line generator of FIG. 4 could be formed as a special purpose unit, possibly combined with logic for performing other functions, and be connected to the system bus the lines 32, 34, 36. The line 32 could be connected to the system data bus 74 for receiving initialization data such as the initial and final line coordinates. The lines 34 and 36 could connect the control logic 30 of the line generator to the address and control buses respectively for receiving address input in association with the received data and for receiving control information. The control logic would then control the enabling of the various elements of the individual elements of the line generator via control links (not shown in the figures). If the display buffer of the workstation were incorporated in the display adapter, the line generator could be incorporated in the adapter as well. The output 64 from the plotting logic could be used to address the display buffer under the control of the control logic 30.

A workstation forming a display system in which the present invention is to be incorporated could have a different configuration of elements from that shown in FIG. 5. For example, the workstation could be provided with adapter means for connecting a mouse or other input means to the system bus in a convention manner. Also, the workstation could also be provided with other devices for displaying lines, such as a pixel-based plotter. In the context of the present invention, the term display system is not intended to be limited to workstations and the like, but is intended to cover any device in which a line may be defined, or drawn, by plotting individual pixels. The plotting of the pixels which is performed by the line generator of the present invention can be for a pixel-based display screen, a pixel-based plotter, or indeed, merely for storage of a pixel-based representation of a line in storage, for example in an All Points Addressable (APA) buffer for subsequent processing.

The present invention has been specifically described with respect to the storage of coded representations of short vectors of up to 17 pels based on Bresenham's Line Algorithm. It will be understood, however, that other embodiments and implementations of the present invention could be based on the storage of short vectors of another line length. For example, a coded representation of short vectors of up to 33 pixels could be stored in a single 32 bit memory word. Indeed, other embodiments and implementations of the present invention could be based on other line drawing techniques. An example, only, of an alternative would be Bresenham's Circle Algorithm for drawing circular arcs which is described on pages 443 to 446 of Foley and Van Dam's book referred to above. If the generation of a circular arc is limited to the first octant and the remaining octants are generated using the symmetry of a circle, each transition between two pixels for forming the arc can be represented by a bit of information. This is because the transitions will only be in one of two directions (i.e. axial or diagonal). If the whole of a quadrant of the circle is to be generated directly, two bits of information would be needed for each transition as the transitions will be in one of three directions (e.g. horizontal, diagonal and vertical). It will be appreciated, therefore, that the number of bits which are used to form an item of information will depend on the number of different directions in which transitions may occur.

We claim:

1. A line generator for determining the individual pixels to be plotted for a line to be drawn on a display device in a display system, said display device having a plurality of discrete display points ("pixels") that are drawn by being illuminated in response to electrical control signals, said line generator comprising:

line definition means for determining pixels to plot, said line definition means including:

(a) a line definition table having a plurality of discrete entries representing a set of lines, in each of which is stored a coded representation of a respective one of said set of lines, the coded representation of each individual line comprising a series of data items representing transitions between adjacent pixels to be plotted for drawing said individual line;

(b) address logic for accessing an appropriate entry in the line definition table for the coded representation of a line to be drawn in response to a line drawing order; and means for generating electrical control signals for causing pixels to be drawn on said display device, said electrical control signals generated in response to said coded representation of said line to be drawn.

2. A line generator as claimed in claim 1 wherein said set of lines comprises only lines up to a predetermined size and in which the line generator additionally comprises a second line definition means for automatically generating a coded representation of a line to be drawn as a string of data items representing said line to be drawn which is greater in size than said predetermined size, said line definitions means responsive to a line drawing order and said coded representation generated according to a prespecified line generation procedure.

3. A line generator as claimed in claim 2 further comprising initialization means for automatically determining whether the line to be drawn is greater than said predetermined size, and for enabling either the first mentioned line definition means if the line is not greater than said predetermined size or, otherwise, enabling the second line generation means.

4. A line generator as claimed in claim 3 further comprising third line definition means for automatically generating a coded representation of a line to be drawn as a string a data items representing said line which is in one of a set of predetermined directions and wherein said initialization means determines whether said line to be drawn is in one of said set of predetermined directions, and if so, enables the third line definition means in preference to said first or said second line definition means.

5. A line generator as set forth in claim 1, 2, 3 or 4, wherein said means for generating said electrical control signals comprises pixel position registers for identifying, at any one time, the location of a pixel to be plotted and plotting means for, in response to successive data items in a string of data items from a line definition means, updating said pixel registers to identify successive pixels to be plotted for a line to be drawn.

6. A line generator as set forth in claim 1, 2, 3 or 4, wherein each data item is a bit of information having either a first binary value indicating a transition in a first direction or a second binary value indicating a transition in a second direction.

7. A line generator as set forth in claim 6 wherein said set of lines comprise lines not greater than a predetermined length, the data items for each line being determined in accordance with Bresenham's Line Algorithm, and wherein said first direction is an axial direction along a first defined axis and said second direction is a diagonal direction in relation to said first defined axis.

8. A line generator as set forth in claim 1, 2, 3 or 4, wherein said address logic is arranged as a two level index structure to access the line definition table using major and minor axis line lengths of a line to be drawn as primary and secondary addressing parameters.

9. A method of determining the individual pixels to be plotted for a line to be drawn in a computer controlled display system, the method comprising the steps of:

accessing in response to a line drawing order a coded representation of the line from a line definition table having a plurality of discrete entries in each of which is stored a coded representation of a respective one of a set of lines, the coded representation of each individual line comprising a string of data items representing the transitions between adjacent pixels to be plotted for drawing said individual line; and generating electrical control signals causing said display system to display said line.

10. A display system comprising:

a display device having a plurality of discrete display points ("pixels"), said pixels being drawn by being illuminated in response to electrical control signals;

a line generator for determining individual pixels to be plotted for a line to be drawn on said display device, said line generator including:

(a) line definition means for determining pixels to plot, said line definition means including:

(1) a line definition table having a plurality of discrete entries representing a set of lines in each of which is stored a coded representation of a respective one of said set of lines, the coded representation of each individual line comprising a string of data items representing the transitions between adjacent pixels to be plotted for drawing said individual line;

(2) address logic for accessing an appropriate entry in the line definition table for the coded representation of a line to be drawn in response to line drawing order; and (b) means for generating electrical control signals for causing pixels to be drawn on said display device, said electrical control signals generated in response to said coded representation of said line to be drawn.

11. A display system as claimed in claim 10 wherein said set of lines comprises only lines up to a predetermined size and in which the line generator additionally comprises a second line definition means for automatically generating a coded representation of a line, said coded representation comprising a string of data items representing said line to be drawn which is greater in size than said predetermined size, said line definition means responsive to a line drawing order and said coded representation generated according to a prespecified line generation procedure.

12. A display system as claimed in claim 11 further comprising initialization means for automatically determining whether the line to be drawn is greater than said predetermined size, and for enabling either the first mentioned line definition means if the line is not greater than said predetermined size or, otherwise, enabling the second line generation means.

13. A display system as claimed in claim 12 further comprising third line definition means for automatically generating a coded representation of a line, said coded representation comprising a string of data items representing said line which is in one of a set of predetermined directions and wherein said initialization means determines automatically whether a line to be drawn is in one of said set of predetermined directions, and if so, enables the third line definition means in preference to said first or said second line definition means.

14. A display system as set forth in claims 10, 11, 12 or 13, wherein said means for generating electrical control signals comprises pixel position registers for identifying, at any one time, the location of a pixel to be plotted and plotting means for, in response to successive data items in a string of data items from a line definition means, updating said pixel registers to identify successive pixels to be plotted for a line to be drawn.

15. A display system as set forth in claims 10, 11, 12, or 13, wherein each data item is a bit of information having either a first binary value indicating a transition in a first direction or a second binary value indicating a transition in a second direction.

16. A display system as set forth in claim 15 wherein said set of lines comprise lines not greater than a predetermined length, the data items for each line being determined in accordance with Bresenham's Line algorithm, and wherein said first direction is an axial direction along a first defined axis and said second direction is a diagonal direction in relation to said first defined axis.

17. A line generator as set forth in claims 10, 11, 12 or 13, wherein said address logic is arranged as a two level index structures to access the line definition table using major and minor axis line lengths of a line to be drawn as primary and secondary addressing parameters.

* * * * *